United States Patent [19]

Canal

[11] Patent Number: 5,349,358

[45] Date of Patent: Sep. 20, 1994

[54] METHOD AND DEVICE TO DETERMINE THE PASSING TO A PRE-SELECTED DISTANCE OF A REFLECTOR POINT BY MEANS OF THE TIME OF PROPAGATION OF A CONTINUOUS WAVE

[75] Inventor: Yves Canal, Antony, France

[73] Assignee: Thomson-CSF, Puteaux, France

[21] Appl. No.: 34,859

[22] Filed: Mar. 19, 1993

[30] Foreign Application Priority Data

Mar. 20, 1992 [FR] France .................. 92 03359

[51] Int. Cl.$^5$ ............................................ G01S 13/38
[52] U.S. Cl. ........................................ 342/128; 342/130
[58] Field of Search ............... 342/122, 128, 129, 130

[56] References Cited

U.S. PATENT DOCUMENTS

| | | |
|---|---|---|
| 4,241,347 | 12/1980 | Albanese et al. ............ 342/128 |
| 4,591,865 | 5/1986 | Canal . |
| 4,812,035 | 3/1989 | Freedman et al. ............ 356/5 |
| 5,134,411 | 7/1992 | Adler . |
| 5,220,331 | 6/1993 | Neininger Günter ............ 342/70 |

FOREIGN PATENT DOCUMENTS

| | | |
|---|---|---|
| 028182 | 6/1981 | European Pat. Off. . |
| 1227158 | 6/1959 | France . |
| 946869 | 1/1964 | United Kingdom . |
| 2024557 | 9/1980 | United Kingdom . |
| 2249448 | 5/1992 | United Kingdom . |

*Primary Examiner*—Mark Hellner
*Attorney, Agent, or Firm*—Pollock, Vande Sande & Priddy

[57] ABSTRACT

The wave is modulated in frequency (or in phase) and a measurement is made of the frequency of the beat between the transmitted wave and the received wave which gives the propagation delay and hence the distance. The method provides for the superimposing, on this modulation, of a periodic over-modulation with a period that is equal to or is a multiple of the propagation delay corresponding to a pre-selected expected distance. The device comprises, at transmission, in the case of a linear modulation of frequency, a saw-tooth generator (31) and a generator of over-modulations (32), for example sinusoidal, controlled by the expected distance given by a distance selector (30). The modulation signal of the transmitter is obtained by summation (33) of the signals of the two generators (31, 32).

8 Claims, 6 Drawing Sheets

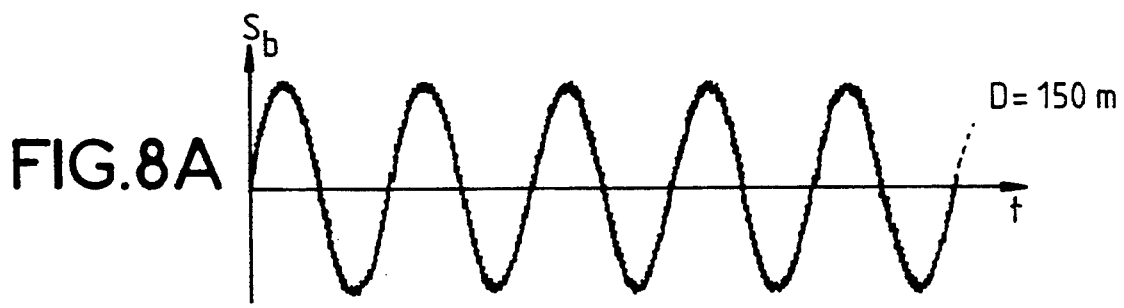
FIG.8A  D = 150 m
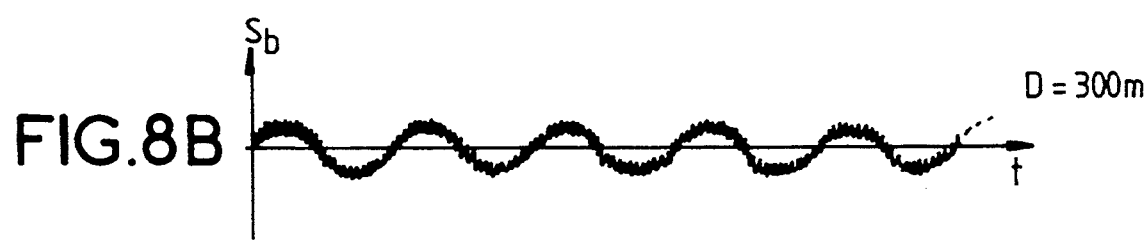
FIG.8B  D = 300 m
FIG.8C  D = 450 m
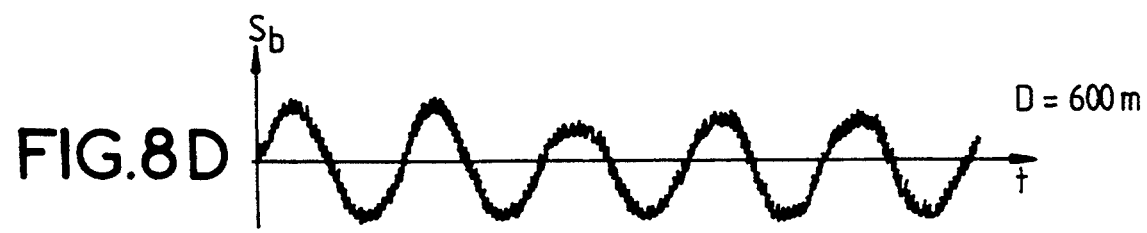
FIG.8D  D = 600 m
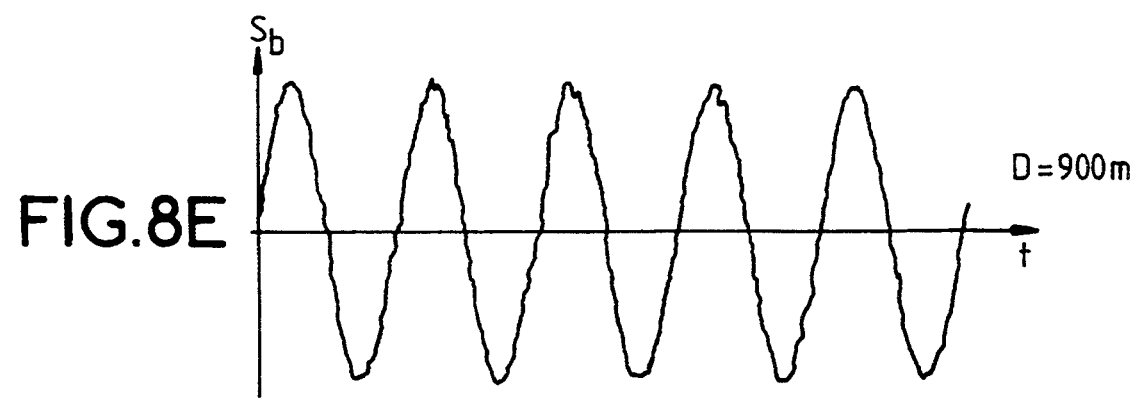
FIG.8E  D = 900 m

METHOD AND DEVICE TO DETERMINE THE PASSING TO A PRE-SELECTED DISTANCE OF A REFLECTOR POINT BY MEANS OF THE TIME OF PROPAGATION OF A CONTINUOUS WAVE

BACKGROUND OF THE INVENTION

The present invention relates to a method and a device to determine the passing of a reflector point to a pre-selected distance by indirect measurement of the propagation delay of a phase-modulated and/or frequency-modulated continuous wave reflected at said point.

In a certain number of fields, a known way to make precise measurements of the distance to a point being aimed at is to measure the travelling time needed for a wave, notably an electromagnetic wave, to return to a transmitter after reflection from the point aimed at. To avoid the use of transmitters with high instantaneous power, systems of continuous transmission in time have been developed, in such a way as to preserve a sufficient level of energy illuminating the point aimed at. The reception therefore takes place simultaneously with the transmission, and to find the time taken for the to-and-fro propagation of the wave, there is provision for the phase and/or frequency coding of the transmitted wave and for determining the delay between the transmitted code and the received code. Systems such as these are found, for example, in the fields of radio-altimetry, altimetrical triggers, anticollision systems for vehicles, etc.

Different codes have been developed for these systems, all based on a modulation of the phase and/or the frequency of the transmitted wave. One of the most commonly used codes is that of the linear modulation of frequency. In this case, the distance is extracted through the multiplying of the received signal by the transmitted signal and through the measuring of the beat frequency obtained. Unfortunately, as it is not a time but a frequency that is directly measured, it is highly possible to conceive of a situation at the point aimed at wherein, between the reception of the wave and its retransmission, there is a frequency shift that falsifies the measurement and hence enables the system to be jammed. It is clear that the same drawback can be found with other known types of coding systems.

SUMMARY OF THE INVENTION

An object of the present invention therefore is to overcome this drawback by making the jamming very difficult to carry out or by making it ineffective.

Another object of the invention is a method that uses a periodic over-modulation superimposed on the normal coding so as to make the useful beat signal disappear outside an expected pre-selected distance and, as the case may be, outside certain harmonic distances.

According to the invention, therefore, there is provided a method to determine the passing of a reflector point to a pre-selected distance by indirect measurement of the delay of propagation of a phase-modulated and-/or frequency-modulated continuous wave reflected at said point, wherein said wave is transmitted towards said point with a characteristic coding in phase and/or in frequency. The wave reflected by said point is received and a temporal analysis is made of the delay between the transmitted code and the received code by means of filtering adjusted to said pre-selected distance, said method comprising an additional step consisting in the superimposing, at the transmission of said wave, on the characteristic coding, of at least one periodic over-modulation having a period equal to N times the delay of propagation of the received wave for said pre-selected distance, where N is a number greater than or equal to 1.

An object of the invention is also a device implementing this method. Through the use of over-modulations, the creation of a phase noise is prompted, causing the useful signal to disappear outside the expected distance, it being no longer possible to recognize the initially planned code except at this distance alone and at certain harmonic distances.

BRIEF DESCRIPTION OF THE DRAWINGS

The invention will be understood more clearly and other features of the present invention will appear from the following description and from the appended drawings, of which:

FIGS. 8A to 8E illustrate the signals obtained for different distances with two over-modulations;

DESCRIPTION OF THE PREFERRED EMBODIMENTS

As already indicated, the present system can be applied to any system carrying out a measurement of the distance to a point aimed at by an indirect analysis of the time needed for a wave to make the return journey on the path between said system and said point.

When an electromagnetic wave is used for this distance measurement, the invention relates notably to any system in the field of radio-altimetry, altimetrical triggering, vehicle anti-collision systems and any system that includes the pre-filtering, in distance, of the signal before it is used.

By way of an example, in order to explain the invention more clearly, we shall choose the case of a radio-altimeter with linear modulation of frequency of a continuous electromagnetic wave, without this being in any way restrictive.

Figure 1:
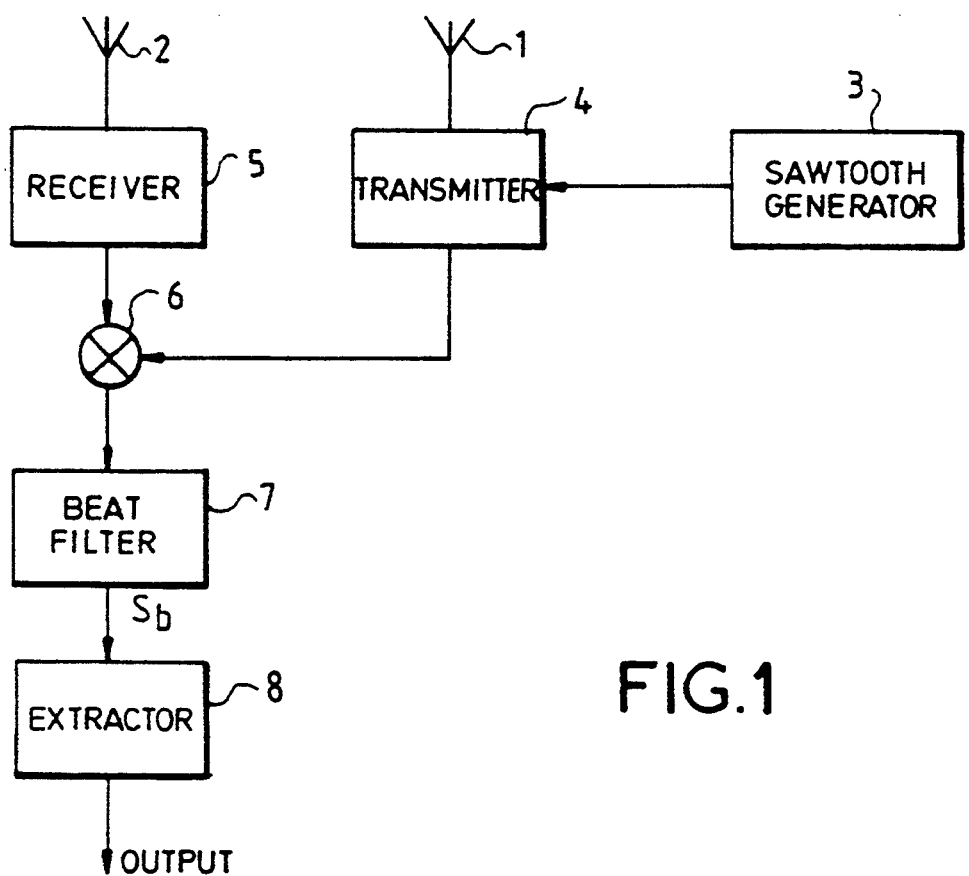
FIG. 1 is the schematic drawing of a standard radio-altimeter.

FIG. 1 is the diagram of a known radio-altimeter such as this. It has a transmission part comprising an antenna 1, a transmitter 4, including, in a standard way, a voltage-controlled oscillator and saw-tooth generator 3 supplying a saw-tooth voltage that controls the frequency of the transmitter. The reception part comprises an antenna 2 followed by a receiver 5 and a mixer 6 which multiplies the received signal with the transmitted signal. The beat signal obtained is sent to a filter 7. The filtered signal $S_b$ is sent to an extractor 8 giving, at its output, the information on the passing to the expected distance determined by the central frequency of the bandpass filter 7.

Figure 2:
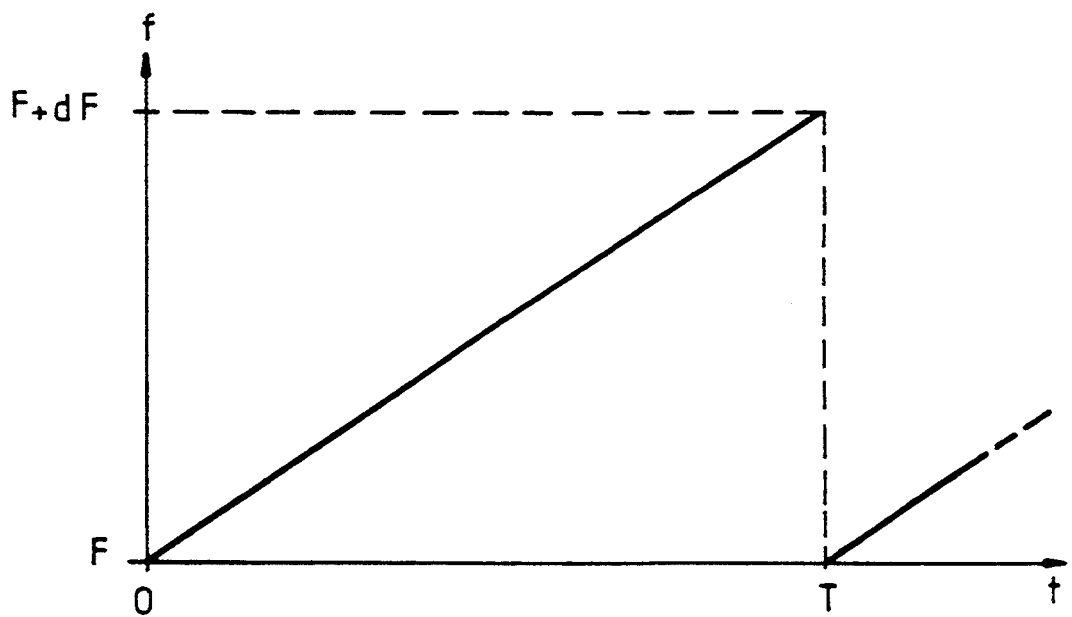
FIG. 2 is an explanatory diagram pertaining to the use of a linear modulation of frequency.

The operation is as follows, referring also to FIG. 2.

The transmitter 4, under the control of the generator 3, sends out a wave with a frequency that varies linearly as a function of the time (FIG. 2) between a value F at the instant 0 and a value F+dF at the end of the time T which is the period of the saw-tooth. The transmitted frequency $F_e$ is written as follows:

$$F_e = F + \frac{dF}{T} t \qquad (1)$$

The delay of propagation of the wave received after reflection at the reflector point aimed at, located at a distance D from the transmitter and the receiver, is equal to:

$$\frac{2D}{c}$$

where c is the speed of propagation of the electromagnetic wave in free space, i.e. the speed of light.

The frequency F of the wave received by the receiver, overlooking the Doppler shift, is:

$$F_r = F + \frac{dF}{T}\left(t - \frac{2D}{c}\right)$$

The mixer 6 gives a beat signal at the frequency $F_b$ (the frequency corresponding to the difference which is the sole frequency preserved by the low-pass filtering):

$$F_b = \frac{dF}{T} \frac{2D}{c} \qquad (2)$$

Figure 3:
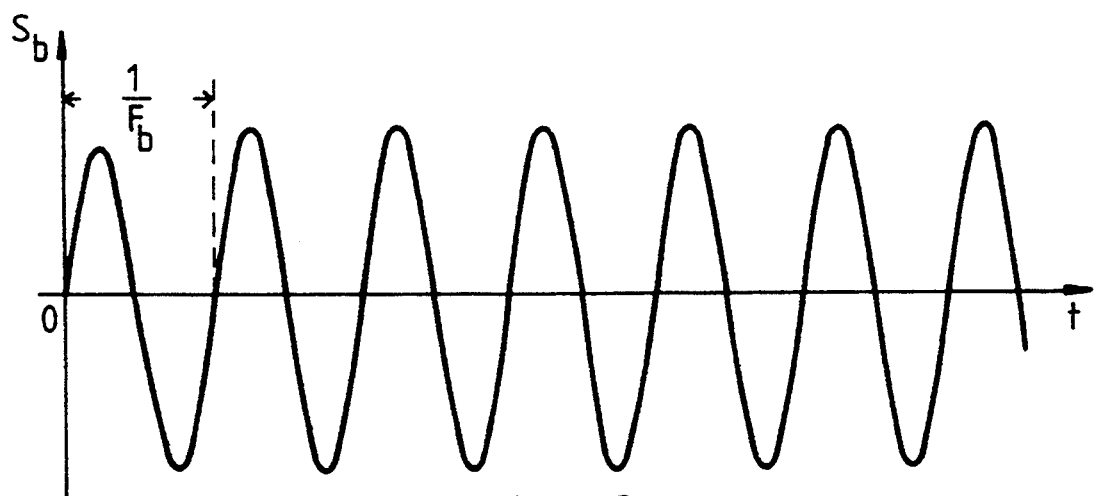
FIG. 3 is a diagram of the beat signal obtained after adjusted filtering.

The beat signal $S_b$, after filtering at a central frequency corresponding to the distance D, is represented in FIG. 3.

It is thus possible to determine the distance by measuring the beat frequency since the slope $$\frac{dF}{T}$$

and the speed c are known.

One possibility often used is that of determining a bandpass filter 7 having a fixed central frequency, i.e. for given parameters dF and T, the filter is adjusted to a pre-selected distance and gives a useful signal only for this distance. It is then possible to modify the expected pre-selected distance by modifying the parameters of the modulation dF and T without changing the filter 7.

However, it is clear that, since it is not a propagation delay but a frequency that is measured, a system mixes two different information elements, representing information on time and on frequency, which gives a possibility of fairly easy jamming. Indeed, if there is a set available, on the ground, for the reception and then the re-transmission, after a frequency shift $F_d$, of the wave transmitted by the transmitter, the beat frequency becomes:

$$F_b' = \frac{dF}{T} \frac{2D}{c} + F_d$$

The distance D' obtained is therefore falsified by:

$$D' - D = \frac{T}{dF} \frac{c}{2} F_d$$

The invention proposes to prohibit this time-frequency mixing through the use of a periodic over-modulation superimposed on a linear modulation to prevent the delby/frequency conversion outside the expected propagation delays.

A first example shall relate to the simple case of the use of only one sinusoidal over-modulation.

It is assumed that the transmitter sends out a wave whose frequency varies according to the relationship:

$$F_e = F + \frac{dF}{T} t + \frac{\pi c}{2\sqrt{2} \ D_o} \sin\left(2\pi \frac{c}{2 D_o} t\right) \qquad (3)$$

where $D_o$ is the expected distance.

Figure 4:
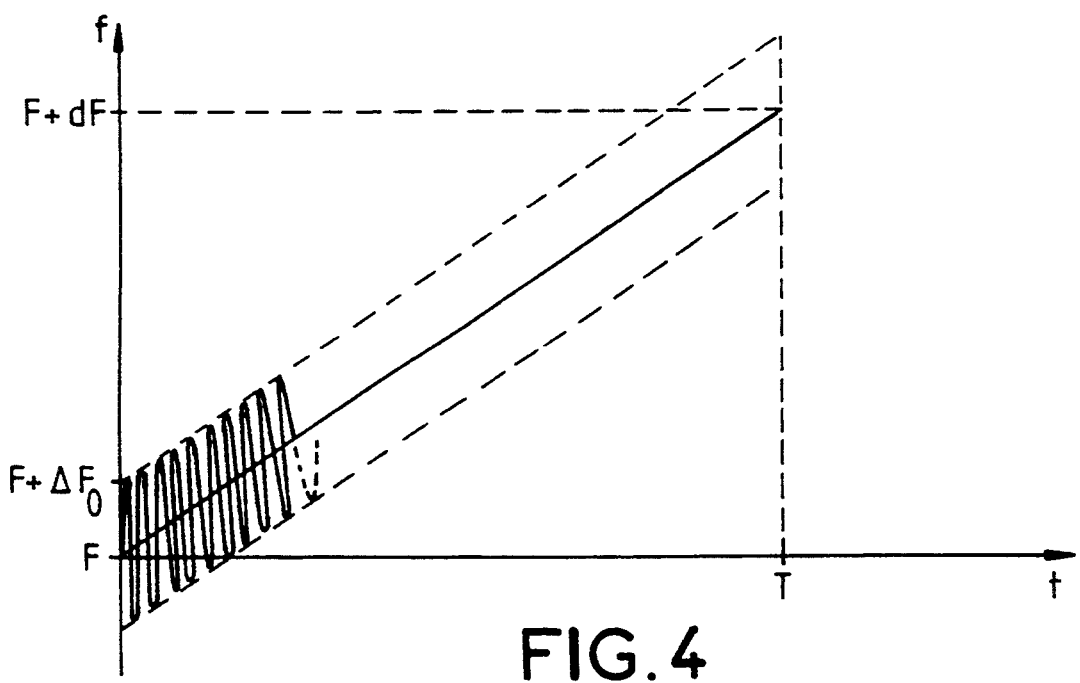
FIG. 4 illustrates the principle of over-modulation according to the invention.

This corresponds to the superimposition, on a linear modulation of frequency of the above type, of a sinusoidal frequency over-modulation, the period of which is:

$$\frac{2 D_o}{c}$$

and the sweep of which is:

$$\Delta F_o = \frac{\pi c}{2\sqrt{2} \ D_o},$$

as shown in FIG. 4.

The phase transmitted is the integral of this frequency (3) as a function of the time, and the received phase is equal to the transmitted phase delayed by the propagation delay. Since the phase of the beat signal $\sigma_b$ is the difference between the transmitted phase and the received phase, computation makes it possible easily to demonstrate that:

$$\phi_b = 2\pi \frac{dF}{T} \frac{2D}{c} t + C^{ste}(D) + \qquad (4)$$

$$2\pi \frac{1}{\sqrt{2}} \sin\left(\frac{\pi D}{D_o}\right) \sin\left(2\pi \frac{ct - D}{2 D_o}\right)$$

The first term of this relationship brings about the reappearance of the beat frequency of the standard linear modulation according to the relationship (2). The last term, on the contrary, is the product of an amplitude as a function of the real distance D multiplied by a sinusoidal function dependent on the time. The result of the term dependent on the time is that the phase of the beat signal undergoes a modulation ranging from $$+ \frac{2\pi}{\sqrt{2}} \sin \frac{(\pi D)}{D_o} \text{ to } - \frac{2\pi}{\sqrt{2}} \sin\left(\frac{\pi D}{D_o}\right)$$

It is seen that, if the real distance D is not a multiple of the pre-selected expected distance $D_o$, then the amplitude of this phase noise is not zero, and the spectrum of the beat signal gets spread substantially, moving away from the expected beat frequency.

On the contrary, if the distance D is a multiple of the expected distance $D_o$, the amplitude of the phase noise is zero and the working of the linear modulation of frequency, examined further above, is repeated exactly. In the worst case, where the real distance D is equal to:

$$\frac{2n+1}{2} D_o,$$

the r.m.s. value of the temporal sine being $$\frac{1}{\sqrt{2}},$$

the r.m.s. value of the phase noise is $\pi$, causing the total disappearance of the useful term:

$$\frac{dF}{T} \frac{2D}{c}$$

which would enable the measurement of distance.

Figure 5:
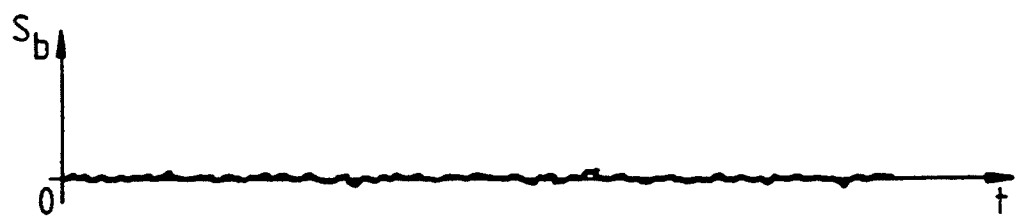
FIG. 5 is a diagram of the beat signal obtained for an unexpected distance.

FIG. 5 shows the signal obtained for a real distance equal to 1.5 $D_o$. This signal $S_b$ is almost zero.

It is thus seen that it is no longer possible to jam the system simply by adding a frequency shift to the reflected wave, for this shift has no effect on the effective value of the phase noise which depends only on the real distance.

The scope of the method thus explained can be extended, with reference to Fourier's theories, to the use of any periodic over-modulation with a period equal to the expected propagation delay:

$$\frac{2 D_o}{c}.$$

In particular, it is perfectly possible to envisage the use of an over-modulation in square-wave form (the result of an infinite superimposition of harmonic sinusoidal functions).

Figure 6:
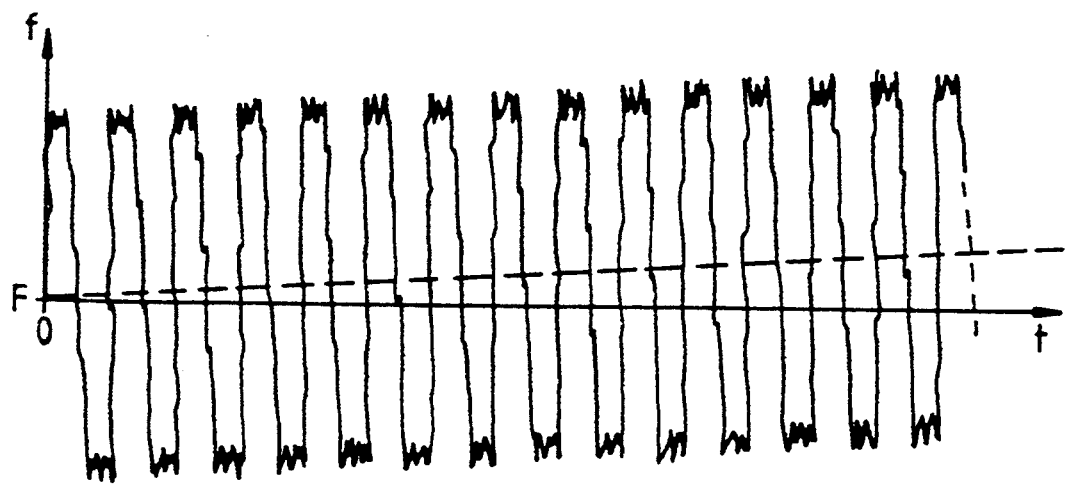
FIG. 6 illustrates the general case of the use of several over-modulations according to the invention.

FIG. 6 shows the frequency modulation obtained by the sum of three sinusoidal over-modulations (on an expanded scale).

As we have seen, the use of a periodic over-modulation, whatever may be its waveform, opens distance windows that periodically permit a normal operation of the linear modulation of frequency. This periodicity is equal to the expected distance $D_o$, i.e. the time/frequency mixing proper to the linear modulation of frequency again becomes possible at all the distances that are multiples of the expected distance.

To reduce or even circumvent this drawback, it is possible to use several over-modulations associated with different expected distances, in taking advantage of the fact that any over-modulation always permits a normal operation of the linear modulation of frequency at zero distance and at close distance.

Figure 7:
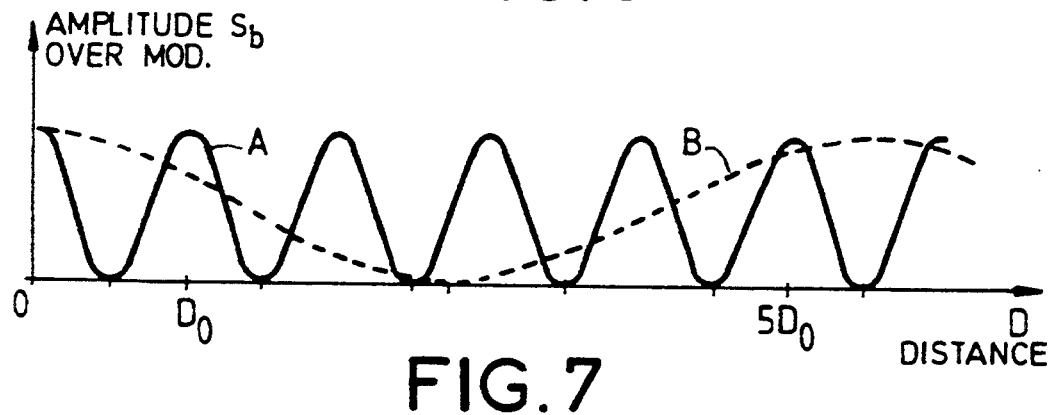
FIG. 7 is a diagram of the amplitude variations of the filtered signal for two different over-modulations.

FIG. 7 shows the variations in amplitude of the useful signal $S_b$ for a given over-modulation, as a function of the real distance D. The curve A corresponds to an over-modulation associated with an expected pre-selected distance $D_o$ and the curve B corresponds to a second over-modulation associated with an expected distance equal to 5.5 $D_o$ in the example shown.

It is clear, from FIG. 7, that a normal operation of the linear modulation of frequency will be had only at the distances $D_o$, $5D_o$, $6D_o$, $11D_o$, $12D_o$, $16D_o$, $17D_o$, ... On the one hand, this is true except for a certain degree of weakening which is variable for the different windows and is a function of the coincidence or non-coincidence of the maximum values of the curves A and B. On the other hand, it must be noted that, from one window to the next one, there is an attenuation of the useful signal due to the attenuation of propagation in distance proportional to $D^2$.

If, in the above example, the attenuation is not sufficient for the first expected harmonic distance $5D_o$, it is possible to use a third over-modulation associated, for example, with an expected distance of 30 $D_o$ which makes it possible to have an increase in attenuation of the order of $30^2$: this margin makes it possible to have a useful signal that is negligible starting with the first distance window after $D_o$.

As an example of a digital application, FIGS. 8A to 8E deal with the case of two over-modulations adjusted to $D_o = 150$ m and 5.5 $D_o$.

FIG. 8A shows the filtered signal $S_b$ for a real distance $D = D_o = 150$ m. The useful signal is present and perfectly detectable at the frequency of the adjusted filter.

FIGS. 8B and 8C show the filtered signal for real distances of 2 $D_o$ and 3 $D_o$. The useful signal has almost disappeared or completely disappeared.

FIG. 8D shows the filtered signal for a real distance equal to $4D_o$. It can be seen that the signal reappears but that it is greatly weakened. Finally, FIG. 8E shows the case where $D = 6D_o$, i.e. a case that is within a permitted window. The filtered signal is really present and its amplitude is even slightly greater than that of the signal of FIG. 8A, it being understood that the attenuation in distance has not at all been taken into account.

Figure 9:
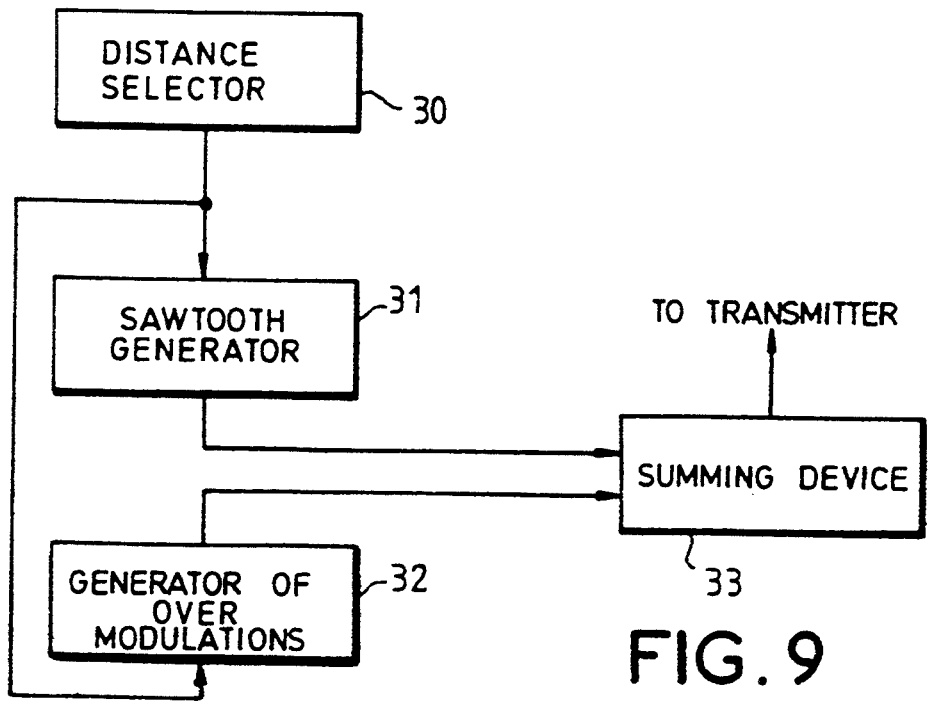
FIG. 9 shows the schematic drawing of a first variant of the device according to the invention.

The method according to the invention having been thus explained, FIG. 9 shows a schematic diagram of a first variant of the device according to the invention. As we have seen, the only modifications to be made to the conventional system relate to the transmission and, more particularly, to the preparation of the control voltage of the transmitter fixing the modulation and over-modulation applied to the transmitted wave.

A distance selector 30 makes it possible to pre-select an expected distance $D_o$.

This expected distance is transmitted, firstly, to a saw-tooth generator 31 which gives the saw-tooth with the slope and the period desired for the linear modulation of frequency associated with $D_o$. Secondly, the expected distance is sent to an over-modulation generator 32 which gives the signal corresponding to the over-modulations associated with $D_o$ at the appropriate period. A summing circuit 33 sums up the signals delivered by the generators 31 and 32 and gives the transmitter control signal. Thus, the circuit of FIG. 9 simply replaces the generator 3 of FIG. 1.

On this basis, it is possible to conceive of other variant embodiments, notably in digital form.

Figure 10A:
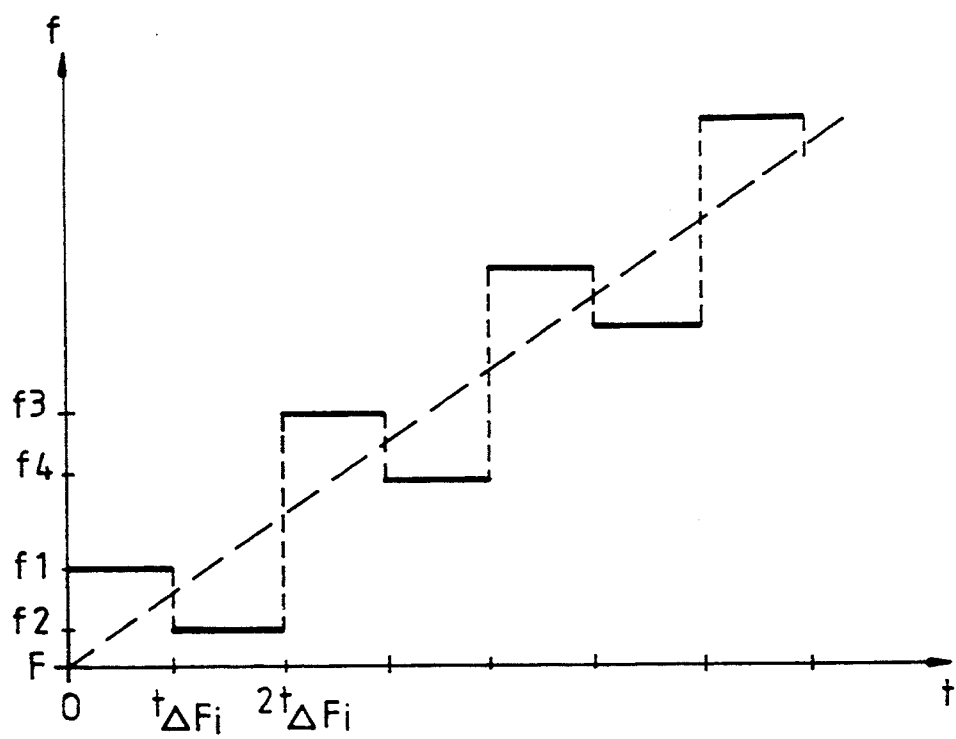
FIGS. 10A and 10B illustrate the signals sent out in two embodiments of a second variant of the device according to the invention.

FIG. 10A represents a curve showing the case of a sinusoidal over-modulation superimposed on a linear modulation of frequency. The period of the over-modulation is $2^t \Delta F_i$ associated with an expected distance $D_{oi}$. The curve is digitized by means of successive quantification levels shown in solid lines f1, f2, f3, f4 . . .

It is clear that, in this case, when the expected distance is modified, the period of the associated over-modulation varies and, hence, so does the duration $t_{\Delta Fi}$, which implies the use of a variable clock.

Figure 10B:
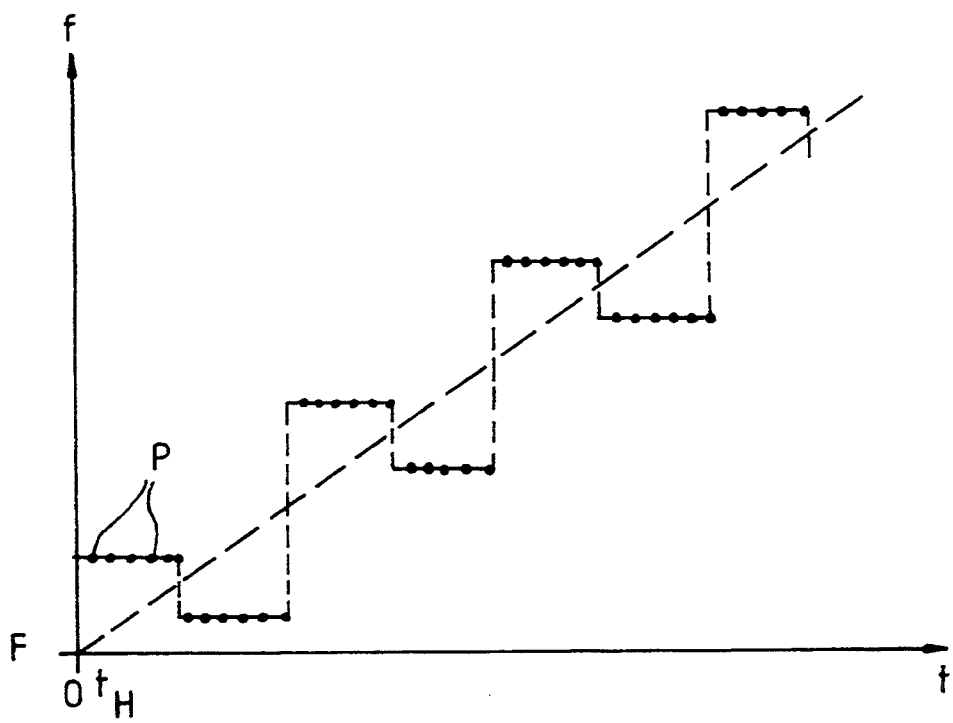

By contrast, FIG. 10B envisages a case where the modulation signal is sampled at a high frequency and is fixed with respect to the periods of over-modulation. The sampling period is $t_H$.

The real over-modulation could have been directly sampled. In fact, it is preferred to take samples P on successive levels as in FIG. 10A. This notably diminishes the number of different levels to be obtained. Furthermore, the error committed in the representation of the modulation, instead of being a drawback, is actually an advantage for it amounts to the use of a large number of sinusoidal over-modulations, which reduces the number of normal working windows and moves them away from each other considerably.

Figure 11:
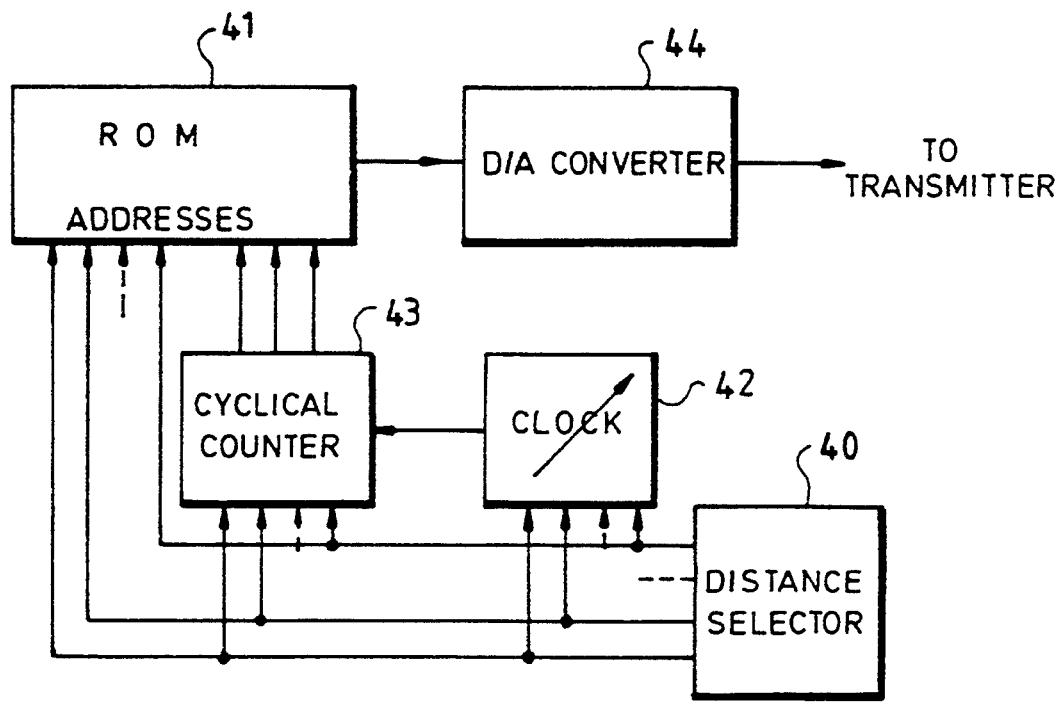
FIG. 11 is a schematic drawing of the first embodiment of this second variant.
Figure 12:
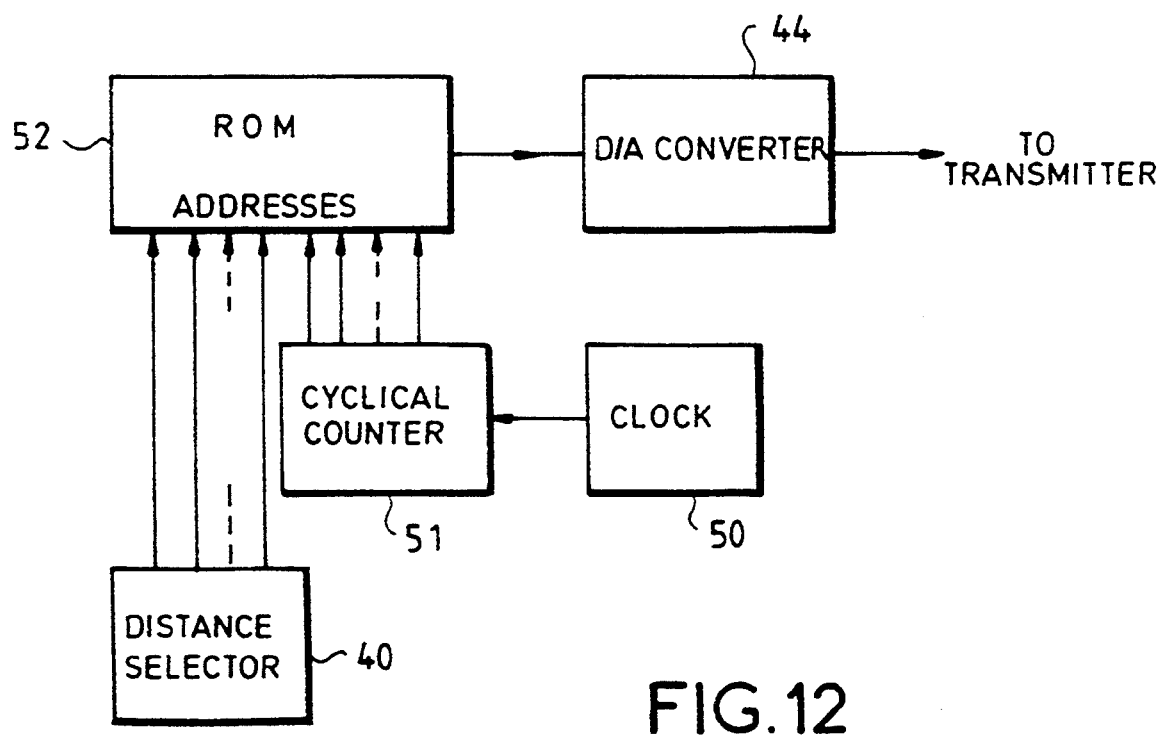
FIG. 12 is a schematic drawing of the second embodiment of this second variant.

FIGS. 11 and 12 show diagrams of digital variants of the device corresponding respectively to the cases of FIGS. 10A and 10B.

In FIG. 11, the device used to generate the modulation signal of the transmitter is built around a read-only memory 41 in which there are stored the different values of successive levels of the over-modulation superimposed on the linear modulation for each expected distance. This memory is addressed firstly by the expected pre-selected distance by a digital distance selector and, secondly, by the codes given cyclically by a programmable cyclical counter 43. This counter gives the successive codes enabling the selection, thereafter, of all the levels corresponding to a period of the linear modulation of frequency. The number of codes to be provided depends on the pre-selected distance, and the counter is therefore programmed by the value given by the distance selector 40. Furthermore, the frequency of changing of the levels of the curve of FIG. 10A depends, for its part too, on the expected distance. The counter 43 receives the clock signals from a variable frequency clock 42 controlled by the value given by the distance selector.

Finally, a digital-analog converter 44 converts the digital values delivered by the memory 41 into an analog signal for the control of the transmitter 4 (FIG. 1).

The advantage of an embodiment such as this is that it can be very easily made in integrated form, the capacity of the memory 41 remaining within limits acceptable for integration.

FIG. 12 shows a second embodiment corresponding to the use of a clock with high and constant frequency (the case of FIG. 10B). This figure again shows a read-only memory 52, containing all the values of samples for each expected value of distance, and the distance selector 40 addressing this memory. A cyclical counter 51 successively gives all the address codes corresponding to the successive samples of a period of the linear modulation of frequency. This counter receives the clock signals from a high-frequency clock 50 with a period $t_H$ (sampling period). Just as in the embodiment of FIG. 11, the converter 44 gives the modulation signal of the transmitter.

Here, owing to the far greater number of samples to be stored, the memory 52 cannot be integrated with the other elements. However, the making of the unit is simpler.

The above description relates to the case where a linear modulation of frequency is used as the coding of the transmitted wave. However, this entire description can be transposed directly to any type of frequency coding and, by means of the integral calculus applied to the over-modulations, to any type of phase coding. Furthermore, the waveform of the over-modulations used has no importance; only their periodicity counts.

Naturally, the exemplary embodiments described in no way restrict the scope of the invention.

What is claimed is:

1. A method to determine the passing of a reflector point by a pre-selected distance from a transmitter by indirect measurement of the delay of propagation, between said transmitter and a receiver means, of a continuous wave modulated according to a modulation, chosen between phase modulation and frequency modulation, and reflected at said point, said method comprising the steps of:

selecting a characteristic coding to be applied to said continuous wave according to said modulation chosen between phase modulation and frequency modulation:

superimposing on said characteristic coding at least one periodic over-modulation having a period equal to N times the delay of propagation of the modulation continuous wave for said pre-selected distance, where N is a number greater than or equal to 1, for delivering an over-modulated characteristic coding;

controlling said transmitter for modulating said continuous wave to be transmitted by said transmitter with said over-modulated characteristic coding, according to said modulation chosen between phase modulation and frequency modulation;

receiving the modulated continuous wave transmitted by said transmitter after reflection at said point; and performing a time analysis of the delay between the transmitted characteristic coding and the received characteristic coding, based on filtering adjusted to said pre-selected distance.

2. A method according to claim 1 wherein said characteristic coding consists of a linear modulation of frequency, wherein said step of performing a time analysis comprises:

obtaining a beat signal between a modulated continuous wave received after reflection at said point and a modulated continuous wave transmitted by said transmitter;

applying said beat signal to a bandpass filter centered on the beat frequency corresponding to said pre-selected distance; and wherein said step of superimposing on said characteristic coding at least one periodic over-modulation further includes superimposing, on said linear modulation of frequency, a sinusoidal over-modulation with a period $$\frac{2D_o}{c},$$

where $D_o$ is said pre-selected distance and c is the speed of propagation of said modulated continuous wave, so that a useful signal is obtained at an output of a filter only for said distance $D_o$ and its multiples.

3. A method according to claim 1, wherein said characteristic coding includes a linear modulation of frequency, wherein said step of performing a time analysis further comprises:

obtaining a beat signal between a modulated continuous wave received after reflection at said point and a modulated continuous wave transmitted by said transmitter; and applying said beat signal to a bandpass filter centered on the beat frequency corresponding to said pre-selected distance; and wherein said step of superimposing on said characteristic coding at least one periodic over-modulation includes superimposing, on said linear modulation of frequency, a plurality of sinusoidal over-modulations with respective periods $$\frac{2n_iD_0}{c}$$

where $D_o$ is said pre-selected distance, c is the speed of propagation of said modulated continuous wave and $n_i$ is a positive real number greater than or equal to 1 and different for each of the i order over-modulations.

4. A device having a transmitter and receiver means to determine the passing of a reflector point by a pre-selected distance of said transmitter by indirect measurement of the delay of propagation, between said transmitter and said receiver means, of a continuous wave modulated according to a modulation, chosen between phase modulation and frequency modulation, and reflected at said point, said device further comprising:

modulating means for controlling said transmitter so as to modulate said continuous wave to be transmitted by a modulation control signal, according to said modulation chosen between phase modulation and frequency modulation, said modulating means including first means for applying a characteristic coding to said continuous wave and over-modulation means for superimposing on said characteristic coding at least one periodic over-modulation having a period equal to N times the delay of propagation of the modulated continuous wave for said pre-selected distance, where N is a number greater than or equal to 1;

said receiver means for receiving the modulated continuous wave transmitted by said transmitter after reflection at said point including filtering means adjusted to said pre-selected distance for performing a time analysis of the delay between the transmitted characteristic coding and the received characteristic coding.

5. A device according to claim 4, wherein said first means further includes a saw-tooth generator generating a linear modulation signal and a distance selector providing the value of said pre-selected distance to said generator so that said linear modulation signal is adjusted to said pre-selected distance, said over-modulation means further has a generator of over-modulations, controlled by said distance selector for delivering an over-modulation signal corresponding to the use of P sinusoidal over-modulations having respective periods of $$\frac{2n_iD_0}{c}$$

where $D_o$ is said pre-selected distance, c is the speed of propagation of said modulated continuous wave and $n_i$ is a positive real number greater than or equal to 1 and different for each of the i order over-modulations, and summing means receiving said linear modulation signal from said saw-tooth generator and said over-modulation signal, for delivering said modulation control signal to said transmitter so as to modulate, in frequency, said transmitter, and wherein said receiver means comprises beat means receiving a transmitted modulated continuous wave transmitted by said transmitter and a received modulated continuous wave received by said receiver means, for obtaining a beat signal between said transmitted and received modulated continuous waves, and bandpass filter centered on a predetermined frequency corresponding to said pre-selected distance.

6. A device according to claim 4, wherein said first means and said over-modulation means further comprise:

a read-only memory containing, in digital form, the values of the samples corresponding to each of the characteristic codings and their associated over-modulations, for each pre-selectable distance value;

a distance selector to provide a digital signal representing said pre-selected distance;

addressing means for addressing said memory from said digital signal; and a digital-analog converter for converting the values of samples delivered successively by said memory into said modulation control signal for controlling said transmitter.

7. A device according to claim 6, wherein said addressing means further comprises:

a clock with a fixed frequency far higher than that of all the over-modulations used; and a cyclical counter receiving the signals from said clock and producing digital signals which, with the signal delivered by the distance selector, constitute the signals for the addressing of said memory.

8. A device according to claim 6, wherein said addressing means further comprises:

a clock with variable frequency controlled by the signal delivered by said distance selector; and a programmable cyclical counter, programmed by said signal delivered by said distance selector, said counter receiving the signals form said clock and giving digital signals which, with the signal delivered by the distance selector, constitute the signals for addressing said memory.

* * * * *